US009543734B2

(12) United States Patent
Zanger et al.

(10) Patent No.: US 9,543,734 B2
(45) Date of Patent: Jan. 10, 2017

(54) LASER ARRANGEMENT FOR GENERATING A TWICE FREQUENCY CONVERTED LASER RADIATION

(71) Applicant: CryLaS Crystal Laser Systems GmbH, Berlin (DE)

(72) Inventors: Eckhard Zanger, Seddiner See (DE); Nariman Khajeh Kazroni, Berlin (DE); Hans-Joachim Pätzold, Berlin (DE)

(73) Assignee: CryLaS Crystal Laser Systems GmbH, Berlin (DE)

( * ) Notice: Subject to any disclaimer, the term of this patent is extended or adjusted under 35 U.S.C. 154(b) by 0 days.

(21) Appl. No.: 14/402,294

(22) PCT Filed: May 23, 2013

(86) PCT No.: PCT/EP2013/060626
§ 371 (c)(1),
(2) Date: Dec. 31, 2014

(87) PCT Pub. No.: WO2013/174926
PCT Pub. Date: Nov. 28, 2013

(65) Prior Publication Data
US 2015/0236471 A1   Aug. 20, 2015

(30) Foreign Application Priority Data

May 25, 2012   (DE) .................. 10 2012 208 912

(51) Int. Cl.
*H01S 3/108*   (2006.01)
*H01S 3/109*   (2006.01)
(Continued)

(52) U.S. Cl.
CPC .............. *H01S 3/109* (2013.01); *H01S 3/025* (2013.01); *H01S 3/082* (2013.01); *H01S 3/0816* (2013.01);
(Continued)

(58) Field of Classification Search
CPC .... H01S 3/08022; H01S 3/082; H01S 3/0092; H01S 3/109
See application file for complete search history.

(56) References Cited

U.S. PATENT DOCUMENTS 5,418,810 A * 5/1995 Eguchi .................. G02F 1/37
372/107
5,621,744 A * 4/1997 Kikuchi ................ G02F 1/37
372/12
(Continued)

FOREIGN PATENT DOCUMENTS

DE   4228862 A1   3/1994
DE   69935237 T2   5/2000
(Continued)

OTHER PUBLICATIONS

International Search Report on related PCT Application No. PCT/EP2013/060626 from International Searching Authority (EPO) dated Oct. 4, 2013.
(Continued)

*Primary Examiner* — Tod T Van Roy
(74) *Attorney, Agent, or Firm* — Klein, O'Neill & Singh, LLP

(57) ABSTRACT

A laser arrangement for generating a twice frequency-converted laser radiation is disclosed, comprising the following: an active medium which by radiation of pump light generates a first laser radiation with a first frequency; a first laser resonator inside of which the first laser radiation
(Continued)

circulates while resonating; a first non-linear crystal which is arranged inside of the first laser resonator and is provided and established to convert the first laser radiation into a second laser radiation with a second frequency that is higher than the first frequency; a second laser resonator inside of which the second laser radiation circulates while resonating; a second non-linear crystal which is arranged inside of the second laser resonator and is provided and established to convert the second laser radiation into a third laser radiation with a third frequency that is higher than the second frequency, wherein the first laser resonator and the second laser resonator are arranged relative to each other such that they have a joint optical section through which both the first laser radiation, circulating in the first laser resonator, and the second laser radiation, circulating in the second laser resonator, radiate. The first laser resonator and the active medium are designed and arranged such that the first laser radiation consists of precisely two adjacent longitudinal modes with two frequencies, wherein the first frequency of the first laser radiation is a sum frequency of these two frequencies, and in that the second laser resonator has an optical path length which allows for a resonance of merely a single longitudinal mode of the second laser radiation.

11 Claims, 4 Drawing Sheets

(51) Int. Cl.
| | |
|---|---|
| *H01S 3/08* | (2006.01) |
| *H01S 3/081* | (2006.01) |
| *H01S 3/02* | (2006.01) |
| *H01S 3/082* | (2006.01) |
| *H01S 3/16* | (2006.01) |

(52) U.S. Cl.
CPC ....... *H01S 3/08022* (2013.01); *H01S 3/08059* (2013.01); *H01S 3/1611* (2013.01); *H01S 3/1643* (2013.01); *H01S 3/1673* (2013.01)

(56) References Cited

U.S. PATENT DOCUMENTS

| | | | |
|---|---|---|---|
| 5,960,015 A * | 9/1999 | Xie | H01S 3/109 372/21 |
| 5,991,317 A * | 11/1999 | Nighan, Jr. | A61F 9/008 372/108 |
| 6,776,538 B2 * | 8/2004 | Whitney et al. | 385/94 |
| 2005/0220165 A1 * | 10/2005 | Caprara | H01S 3/109 372/95 |
| 2006/0176916 A1 | 8/2006 | Zanger et al. | |
| 2012/0009111 A1 * | 1/2012 | Knupp | C06B 27/00 423/293 |
| 2014/0023098 A1 * | 1/2014 | Clarkson | H01S 3/0675 372/3 |

FOREIGN PATENT DOCUMENTS

| | | |
|---|---|---|
| DE | 10118793 A1 | 6/2002 |
| DE | 60205500 T2 | 3/2003 |
| DE | 10339210 A1 | 8/2004 |
| DE | 102007027680 B3 | 2/2009 |

OTHER PUBLICATIONS

T. Baer, "Large-amplitude fluctuations due to longitudinal mode coupling in diode-pumped intracavity-doubled Nd:YAG lasers", J. Opt. Soc. Am. B, vol. 3, No. 9, Sep. 1986, pp. 1175-1180.

S. Falter et al., "Dynamics and stability of a laser system with second-order nonlinearity", vol. 22, No. 9, Optics Letters, May 1, 1997.

* cited by examiner

LASER ARRANGEMENT FOR GENERATING A TWICE FREQUENCY CONVERTED LASER RADIATION

CROSS-REFERENCE TO A RELATED APPLICATION

This application is a national phase patent application of International patent application PCT/EP 2013/060626, filed on May 23, 2013, which claims priority of German patent application 10 2012 208 912.8, filed on May 25, 2012.

BACKGROUND

The present invention relates in an aspect to a laser arrangement for generating a twice frequency-converted laser radiation.

Such a laser arrangement is particularly suitable for generating a single-frequency, low-noise laser light with a wavelength in the UV range.

Numerous lasers with a frequency conversion inside of a resonator are known from prior art, which are employed to generate laser light with a wavelength in the UV range. The frequency conversion inside of a resonator here serves to increase the frequency of the initially generated laser light in order to generate, proceeding from longer-wave laser light, short-wave laser light with a wavelength in the UV range.

From DE 103 39 210 A1 a laser arrangement is known, in which altogether three laser resonators, arranged one after the other, are provided in order to obtain twice frequency-converted laser light. The first laser resonator serves for generating a fundamental wave, the second laser resonator for generating the second harmonic (first overtone) and the third laser resonator for generating the fourth harmonic (third overtone). The individual resonators must be coupled with a complex optics in order to enable an efficient transition of the laser light to be converted from one resonator to the next resonator.

From U.S. Pat. No. 5,621,744 A a laser arrangement is known, having a first frequency conversion stage inside of a resonator and an external second frequency conversion stage. The external second frequency conversion stage is here designed as a circular laser resonator. In such an arrangement, also, a comparatively complex optics is necessary in order to ensure a correct coupling of the laser radiation into the second frequency conversion stage.

From DE 42 28 862 A1 a laser arrangement is known, in which two laser resonators are coupled with each other and in which the laser light circulating in the two resonators partially radiates through a joint section of both resonators. The drawback of this arrangement is the use of a so-called multimode laser, which emits multi-frequency laser light, has a small coherence length and, moreover, has undesirable amplitude noise in the generated laser light.

From DE 101 18 793 A1 a laser arrangement is known, in which two non-linear crystals are arranged in a joint resonator in order to in this manner attain a two-fold frequency conversion of the laser light radiated into it. By refraining from the use of a further laser resonator, this arrangement can be designed in an optically less complex manner. However, the drawback is that the efficiency of the arrangement is low if only one frequency circulates in the laser resonator while resonating. If in the arrangement all the generated frequencies are made resonant, then undesirable amplitude noise can likewise occur in the emitted laser radiation.

SUMMARY

The object underlying the present invention is to provide a laser arrangement with a two-fold frequency conversion which avoids the previously described drawbacks of laser arrangements known from prior art. In particular, a laser arrangement is to be developed that can generate a stable and low-noise laser radiation with a wavelength in the UV range in an efficient manner and with low expenditure, wherein at the same time a compact structural form of the laser arrangement shall be possible.

This object is achieved with a laser arrangement with the features explained in the following. Such a laser arrangement serves to generate a twice frequency-converted laser radiation. In an embodiment, this laser radiation has single-frequency laser light with a wavelength in the UV range. The laser arrangement has an active medium, which by radiation of pump light generates a first laser radiation with a first frequency. The pump light is provided by a pump light source and radiated onto the active medium. The active medium can, for instance, be a laser crystal of a conventional material such as Nd:YAG or Nd:YVO$_4$. That is to say, in this case a solid-state laser would be employed. However, other active media such as a gas or a liquid would basically also be conceivable. In an embodiment, the pump light source is planned such that a continuous laser radiation is generated.

The laser arrangement, furthermore, has a first laser resonator, inside of which the first laser radiation circulates. Furthermore, a first non-linear crystal is provided, which is arranged inside of the first laser resonator and is provided and established to convert the first laser radiation into a second laser radiation. The second laser radiation here has a second frequency that is higher than the first frequency. In an embodiment, the second frequency is an integer multiple of the first frequency. If the first frequency is the fundamental frequency of the laser radiation, the second frequency would, in an embodiment, consequently correspond to the second harmonic, the third harmonic or the fourth harmonic. Especially suited is an embodiment, in which the first frequency corresponds to the fundamental frequency and the second frequency to the second harmonic.

The laser arrangement, furthermore, has a second laser resonator, inside of which the second laser radiation circulates while resonating. Moreover, inside of the second laser resonator a second non-linear crystal is arranged, which is provided and established to convert the second laser radiation into a third laser radiation. The third laser radiation here has a third frequency that is higher than the second frequency. In an embodiment, the third frequency is an integer multiple of the second frequency. If the first frequency corresponds to the fundamental frequency and the second frequency corresponds to the second harmonic, the third frequency, in an embodiment, is the fourth harmonic. In this manner, the frequency of the laser radiation would be doubled both in the first laser resonator and in the second laser resonator, respectively, so that in the end there would be a laser radiation with four times the frequency of the first frequency. In this manner, it is especially possible to generate a laser radiation with a wavelength in the UV range.

The first laser resonator and the second laser resonator are here arranged relative to each other such that they have a joint optical section. Both the first laser radiation, circulating in the first laser resonator, and also the second laser radiation, circulating in the second laser resonator, radiate through this joint optical section. That is to say, in this joint optical section the first laser radiation and the second laser radiation are present in equal measure.

By using two laser resonators which are coupled via a joint optical section a coupling of separate laser resonators in a complex optical construction, as it is known from prior art, can be dispensed with.

This geometrical design also makes possible an especially compact construction of the laser arrangement claimed according to an aspect of the invention. For instance, a coupling of two passive resonators one after the other by means of a suitable optics regularly involves considerable adjustment effort and a large requirement for space. However, a compact construction is in that manner not possible.

The laser arrangement claimed according to an aspect of the invention is characterized in that the first laser resonator and the active medium are designed and arranged such that the first laser radiation consists of precisely two adjacent longitudinal modes having one frequency each (together, therefore, two frequencies). The first frequency of the first laser radiation consequently has two frequency shares. The second frequency of the second laser radiation represents the sum frequency of these two frequencies of the longitudinal modes of the first laser radiation. Furthermore, the laser arrangement claimed according to an aspect of the invention is characterized in that merely a single longitudinal mode of the second laser radiation circulates in the second laser resonator while resonating. In order to achieve this, the optical length of the second laser resonator is adjusted accordingly, so that further longitudinal modes of the second laser radiation cannot circulate in the second laser resonator while resonating.

Due to this specific design and arrangement it is possible to attain a frequency conversion of the first laser radiation with the help of the first non-linear crystal with a very high efficiency and yield. Moreover, the problem of amplitude fluctuation, known under the technical term "green problem", is effectively avoided. In this manner, it is also possible to convert the first laser radiation in an especially low-noise manner into laser radiations of a higher frequency. Furthermore, by this arrangement the second laser radiation is also highly efficiently converted in a low-noise manner, wherein the resulting third laser radiation exists as a single-frequency laser radiation.

Basically, multiple designs and arrangements of the first laser resonator and of the active medium can be considered to make the first laser radiation consist of precisely two adjacent longitudinal modes. For example, frequency-selective elements such as, for instance, optical filters can be arranged inside of the first laser resonator. In this manner, undesirable longitudinal modes of the first laser radiation can deliberately be filtered out of the initially generated laser radiation. In an embodiment of the laser arrangement, however, there are precisely no frequency-selective components present inside the first laser resonator and/or the second laser resonator. For, typically, frequency-selective elements are accompanied by an intensity reduction of the laser radiation or an efficiency reduction of its conversion into a laser radiation with another frequency.

In a further embodiment the active medium is arranged in the optical center of the first laser resonator. The term "optical center" here refers to the location that is located in the center of the resonator relating to the optical path length, i.e. the geometrical path length multiplied with the refraction index of the respective medium. As the active medium itself has a specific length, it needs to be defined, moreover, which point of the active medium shall be located in the optical center. The active medium is excited by an outside energy source, generally a source of light. This excitation is often not distributed evenly over the length of the active medium. In this case, the core area of the excitation intensity distribution of the active medium shall be located in the optical center of the resonator. If the active medium is excited, e.g. by a pump light source, the result is an intensity distribution according to the Beer-Lambert law:

$$I(x)=I_0 * e^{-\alpha x}$$

wherein I is the excitation intensity in the active medium at the distance x from the entry side of the pump radiation, $I_0$ is the excitation intensity at the location x=0 and $\alpha$ is the absorption coefficient. The core area of this intensity distribution is approximately located at the location:

$$xc \approx 1/\alpha$$

With a conventional laser crystal as the active medium and a typical doping, the excitation core area typically lies at a distance of approximately 1 mm from the entry side on the inside of the crystal.

By such an arrangement the highest-possible efficiency of the active medium is ensured. For by arranging the active medium in the optical center of the first resonator, the spatial burning of a hole (also known to a person skilled in the art under the technical terms "spatial hole burning" or "hole burning effect") is avoided. Furthermore, arranging the active medium in the optical center of the first laser resonator is favorable to the two-mode operation of the laser arrangement, that is, the first laser radiation consists of precisely two adjacent longitudinal modes. Consequently, by means of the geometrical design and arrangement of the first laser resonator and of the active medium it can be attained in an especially suited manner that the first laser radiation, as desired, consists of precisely two adjacent longitudinal modes. That means that with such an arrangement the technical effort to suppress undesirable modes of the first laser light is very low.

In a further embodiment the joint optical section of the first laser resonator and the second laser resonator is located between a joint mirror of both laser resonators and a partially transmitting mirror. This partially transmitting mirror is here configured such that it reflects the first laser radiation with the first frequency, while it is transmitting for the second laser radiation with the second frequency. Alternatively, the partially transmitting mirror can also be configured such that it is designed to be essentially transmitting for the first laser radiation with the first laser frequency and essentially reflective for the second laser radiation with the second frequency.

In an embodiment, the remaining sections of the first laser resonator and of the second laser resonator which do not correspond to the joint optical section are arranged at an angle relative to each other. In this case, for instance, the optical axis of the second laser resonator could at least partially run parallel to the optical axis of the joint optical section or be configured as an extension to this optical axis of the joint optical section. Furthermore, the optical axis of the remaining section of the first laser resonator could be arranged at an angle relative to the optical axis of the joint optical section of both laser resonators. By means of such an arrangement the space required can be further reduced. Furthermore, it is ensured by the first partially transmitting mirror that the first laser resonator and the second laser resonator are optically separate from each other outside of the joint optical section. Adjustments that are carried out within the second laser resonator consequently to not affect the first laser resonator although both laser resonators have a joint optical section.

In a further embodiment the first non-linear crystal is arranged inside of the joint optical section. This facilitates the decoupling of the second laser light out from the first laser resonator. As the first laser radiation consists of two longitudinal modes, both longitudinal modes are frequency-altered in the first non-linear crystal. Additionally, by a sum frequency mixing of the two longitudinal modes of the first laser radiation a third frequency is produced, which corresponds to the sum of the two frequencies. The intensity of this sum frequency radiation is twice as high as the sum of the intensities of both individual frequency-altered longitudinal modes. For the sake of convenience, however, the second frequency can also be specified as harmonic of the first frequency or, by means of a corresponding multiplication factor, in comparison to the first frequency.

As already explained above, the second laser resonator has an optical path length, which allows for a resonance of merely a single longitudinal mode of the second laser radiation. When the first non-linear crystal causes a frequency doubling of the first frequency of the first laser radiation to become the second frequency of the second laser radiation, this second laser radiation would basically consist of three longitudinal modes. However, as a resonance is made possible merely for a single longitudinal mode, two of these three possible longitudinal modes are practically suppressed completely. As a result, in this manner it is ensured that the second frequency of the second laser radiation actually consists of only a single longitudinal mode of the second resonator and, thus, of a single frequency. In an embodiment, the optical length of the second laser resonator is adjusted such that precisely that longitudinal mode of the three possible longitudinal modes of the second laser radiation is resonating which has the highest intensity anyway. This is the middle one of the three possible longitudinal modes. With such an embodiment an especially high light yield can be attained.

As a result, the resonance magnification of the two longitudinal modes of the first laser radiation and a single longitudinal mode of the second laser radiation results in an especially high conversion efficiency of the first laser radiation with the first frequency into the second laser radiation with the second frequency.

The second non-linear crystal arranged inside of the second resonator now takes care of a further frequency increase, in particular a frequency doubling, of the second frequency of the second laser radiation. As the second laser radiation circulates in the second laser resonator while in resonance magnification, this conversion process also takes place with a high efficiency. Moreover, as the second laser radiation consists of a single longitudinal mode, the converted third laser radiation is also a single-frequency laser radiation. That is to say, the third frequency has a single longitudinal mode just like the second frequency.

In a variant the second non-linear crystal has a material with electro-optical properties. Suitable are, among others, the crystal materials beta barium borate (BBO), potassium dihydrogen phosphate (KDP), potassium dideuterium phosphate (KD*P), ammonium dihydrogen phosphate (ADP) and cesium lithium borate (CLBO). In an embodiment, the second non-linear crystal is entirely made of this material. In this case, the second non-linear crystal not only serves to convert the frequency but also acts as phase modulator in order to impress a phase modulation onto the second laser radiation circulating in the second laser resonator. This impressing can, for instance, be accomplished by applying a high-frequency electrical field to two suitable contact surfaces of the second non-linear crystal. The phase modulation thus impressed onto the second laser radiation can then be employed for regulating and control purposes.

In a further embodiment the laser arrangement has a light sensitive element, which is arranged such that a part of the second laser radiation circulating in the second laser resonator is directed onto the light sensitive element. A suitable light sensitive element is, for instance, a photo-detector. In this manner it is possible to detect specific properties of the second laser light. When, for instance, a phase modulation is impressed onto the second laser light, an evaluation of this phase modulation can take place by means of the photo-detector.

In a further embodiment the laser arrangement has a control appliance, which is provided and established to modify the optical path length of the second laser resonator depending on the properties of the laser radiation directed onto the light sensitive element. Hence, in an embodiment, there is a coupling between the light sensitive element and the control appliance, wherein the light detected by the light sensitive element is converted into an input signal for the control appliance. The control appliance can then serve to lengthen or shorten the optical path length of the second laser resonator, wherein the control result is verified, for instance, by the phase or amplitude modulation of the portion of the second laser radiation that is detected by the light sensitive element. Such a control appliance is an especially suited possibility to adjust the optical path length of the second laser resonator such that the intensity of the circulating second laser radiation reaches its maximum.

In an embodiment, the control appliance is employed to increase to maximum that longitudinal mode of the second laser radiation in terms of its intensity which circulates in the second laser resonator while resonating.

In a further variant the second laser resonator has a moveable deflecting mirror. With such a moveable deflecting mirror it is possible in an especially simple manner to modify the optical path length of the second laser resonator. Such a deflecting mirror can, for instance, be arranged on an adjustment element that can move the mirror along the angle bisector of the entering and exiting laser beam. Moving the adjustment element can take place, for instance, by means of a piezo element. However, other motion elements that can quickly be activated and finely adjusted are equally suited to move the adjustment element.

With UV lasers, a generally big challenge is the life-span of the laser, as the entire optics struck by UV radiation undergoes extreme strain. However, in the industry today, there is a demand for life-spans of 20 000 hours and more. Subsequently, embodiments of the present laser arrangement are specified which contribute to an extension of the life-span. These embodiments are not restricted to the presently specified laser arrangement but can instead be employed in any other laser arrangements in an analogous manner.

In a variant that area of the laser arrangement in which there is UV radiation is hermetically sealed against the remaining part. In the present case, this is a part of the second laser resonator. In an embodiment, the hermetical sealing here takes place in such a way that the laser radiation can leave the sealed area essentially without any loss. The atmosphere inside of this sealed area is held especially pure by an adsorbing material. In an embodiment, the adsorbing material adsorbs water and/or volatile organic substances.

In an embodiment, the adsorbing material has a mix of at least a molecular sieve and activated carbon. In particular, it consists of such a mix. The molecular sieve almost completely binds the water in the air, while the activated carbon removes volatile organic substances from the air. Thus, hardly any or no harmful substances can form as a result of applying the UV radiation, which said substances could otherwise damage the optical components of the laser arrangement.

In a variant the invention thus relates to an arrangement for generating laser light with a wavelength in the UV range, in which at least those areas in which light with a wavelength in the UV range circulates or occurs are hermetically sealed against the remaining areas of the laser arrangement, wherein the hermetically sealed areas have an adsorbing material.

BRIEF DESCRIPTION OF THE DRAWINGS

Further properties and details of aspects of the presently claimed invention will be further explained with the help of exemplary embodiments and corresponding figures. In the figures:

DETAILED DESCRIPTION

Figure 1:
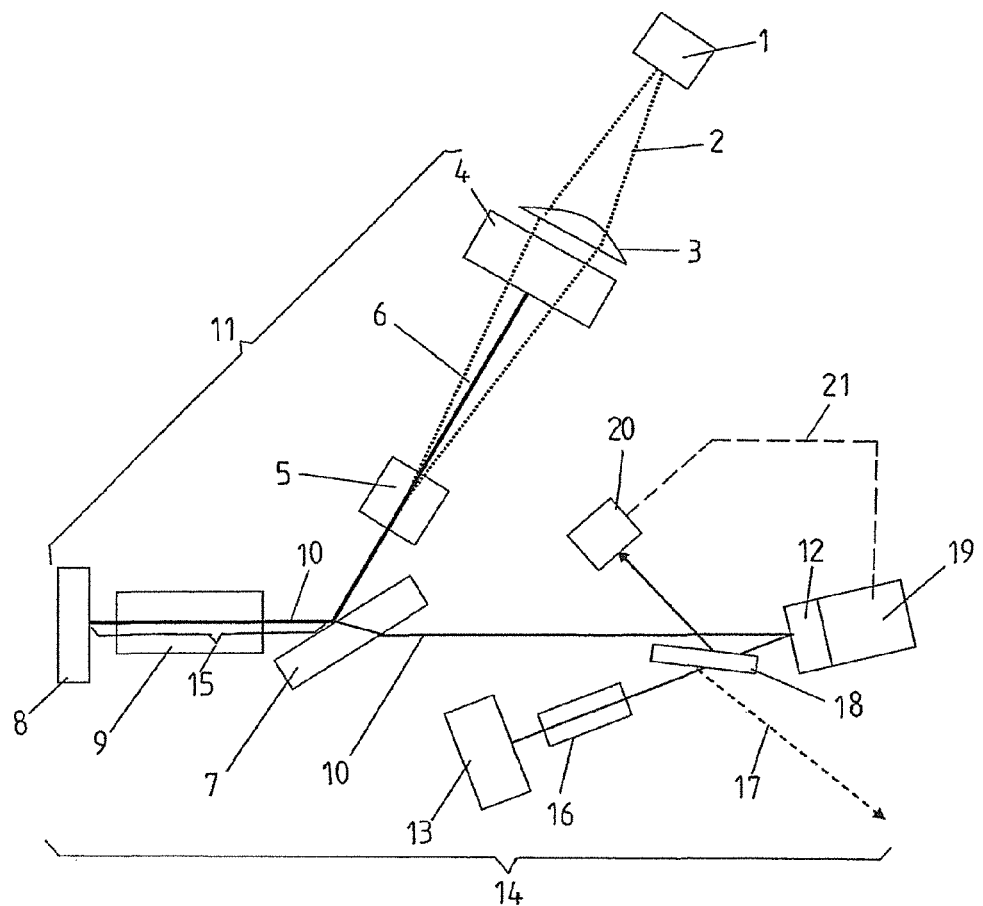
FIG. 1 shows a first exemplary embodiment of a laser for generating a twice frequency-converted laser radiation.

FIG. 1 shows a schematic illustration of a first exemplary embodiment of a laser arrangement for generating a twice frequency-converted laser radiation. A pump light source 1 emits pump light 2, which is focused onto a laser crystal 5 by a focusing optics 3 and a first partially transmitting mirror 4. The first partially transmitting mirror 4 is transparent for the pump light 2. The laser crystal is a Nd:YVO$_4$ laser crystal serving as active medium. The pump light 2 excites the laser crystal 5 to emit a first laser radiation 6. The first partially transmitting mirror 4 is reflective for the first laser radiation 6. Hence, the first laser radiation 6 is reflected by the first partially transmitting mirror 4. The thus reflected first laser radiation 6 strikes a second partially transmitting mirror 7, which is likewise reflective for the first laser radiation 6. Hence, the first laser radiation 6 is reflected on the second partially transmitting mirror 7 and strikes a first resonator mirror 8. This first resonator mirror 8 is likewise reflective for the first laser radiation 6 so that said first laser radiation 6 is again reflected back to the second partially transmitting mirror 7 and to the first partially transmitting mirror 4. The second partially transmitting mirror 7 here acts as deflecting mirror, which deflects the first laser radiation 6 from the first partially transmitting mirror 4 to the first resonator mirror 8 and back. That is to say, the first partially transmitting mirror 4 and the first resonator mirror 8 are arranged at an angle to each other.

The laser crystal 5 is here arranged in the optical center between the first partially transmitting mirror 4 and the first resonator mirror 8. More specifically, the excitation core area of the laser crystal 5, that is to say, the core area of the population inversion decreasing in the beam direction of the pump radiation 2, is located in the optical center between the first partially transmitting mirror 4 and the first resonator mirror 8.

As a consequence of arranging the laser crystal 5 in the optical center between the first partially transmitting mirror 4 and the first resonator mirror 8 only two longitudinal modes (also referred to as axial laser modes) are excited. Hence, the first laser radiation 6 consists of only two adjacent longitudinal modes. In the exemplary embodiment of FIG. 1 the first laser radiation 6 is, moreover, polarized perpendicular to the paper plane.

A first non-linear crystal 9 is arranged between the second partially transmitting mirror 7 and the first resonator mirror 8. This non-linear crystal 9 serves to double the frequency of the first laser radiation 6, so that a second laser radiation 10 is generated, the frequency of which is twice as big as the frequency of the first laser radiation 6. The second laser radiation 10 propagates collinear to the first laser radiation 6.

The first resonator mirror 8 is here coated such that it also essentially completely reflects the second laser radiation 10. In contrast, the second partially transmitting mirror 7 is configured such that it is essentially completely transmitting for the second laser radiation 10. That is to say, the second laser radiation 10, which propagates proceeding from the first non-linear crystal 9, is not reflected in the direction of the first partially transmitting mirror 4 at the second partially transmitting mirror 7, but instead radiates through the second partially transmitting mirror 7. On account of the refractive properties of the second partially transmitting mirror 7 there is merely a slight parallel off-set of the second laser radiation 10 after it has exited the second partially transmitting mirror 7 again.

The first partially transmitting mirror 4, the laser crystal 5, the second partially transmitting mirror 7 and the first resonator mirror 8 together form a first laser resonator 11.

When the second laser radiation 10 radiates through the second partially transmitting mirror 7, it strikes a second resonator mirror 12 and is, by said second resonator mirror 12, essentially completely directed onto a third resonator mirror 13. The third resonator mirror 13 is also configured to be essentially completely reflective for the second laser radiation 10 so that the second laser radiation 10 is reflected back and forth between the first resonator mirror 8, the second resonator mirror 12 and the third resonator mirror 13. Correspondingly, the first resonator mirror 8, the second resonator mirror 12 and the third resonator mirror 13 form a second laser resonator 14. The second partially transmitting mirror 7 is here arranged inside of the second laser resonator 14, however, the second laser radiation 10—as mentioned—simply radiates through it.

The section between the first resonator mirror 8 and the first partially transmitting mirror 7 represents a joint optical section 15 of the first laser resonator 11 and of the second laser resonator 14. Both the first laser radiation 6 and the second laser radiation 10 are in this joint optical section 15. In contrast, essentially only the first laser radiation 6 circulates between the first partially transmitting mirror 4 and the second partially transmitting mirror 7. In an embodiment, the pump light 2 does not reach the first partially transmitting mirror 7 but instead is completely converted into the first laser radiation 6 in the laser crystal 5.

A second non-linear crystal 16 is arranged between the second resonator mirror 12 and the third resonator mirror 13. This second non-linear crystal 16 serves to double the frequency of the second laser radiation 10. That is to say, by means of the second non-linear crystal 16 a third laser radiation 17 is generated, which propagates collinear to the second laser radiation 10. Due to the frequency doubling of the origin frequency of the first laser radiation taking place both in the first non-linear crystal 9 and the second non-linear crystal 16, respectively, 6 the third laser radiation 17 has four times the frequency of the first laser radiation 6. In other words, it is the fourth harmonic of the first laser radiation 6.

The third resonator mirror 13 is configured such that it is essentially completely reflective not only for the second laser radiation 10 but also for the third laser radiation 17. Moreover, a third partially transmitting mirror 18 is arranged between the second resonator mirror 12 and the third resonator mirror 13. This third partially transmitting mirror 18 is essentially completely transmitting for the second laser radiation 10, while it is essentially completely reflective for the third laser radiation 17. That is to say, the third partially transmitting mirror 18 serves to couple the third laser radiation 17 out from the second laser resonator 14.

In order to attain an especially good ratio between transmission and reflection in the second partially transmitting mirror 7 and the third partially transmitting mirror 18, the incident angles of the first laser radiation 6 onto the second partially transmitting mirror 7 and of the second laser radiation 10 onto the third partially transmitting mirror 18 are presently configured as Brewster angle. As already mentioned, the first laser radiation 6 is polarized perpendicular to the paper plane. Selecting the Brewster angle as the incident angle onto the second partially transmitting mirror 7 here leads to an especially good reflection of the first laser radiation 6 at the first partially transmitting mirror 7. The second laser radiation 10 is polarized in the paper plane and, therefore, it can go especially well through the second partially transmitting mirror 7. The same is true for a transmission of the second laser radiation 10 through the third partially transmitting mirror 18. In contrast, the third laser radiation 17, in turn, is polarized perpendicular to the paper plane of FIG. 1 and is reflected especially well at the third partially transmitting mirror 18.

The second resonator mirror 12 is assembled onto an adjustment element 19, which allows for a movement of the second resonator mirror 12 along the angle bisector of the entering and exiting second laser beam 10. Moving the adjustment element 19 is here, for example, done by a piezo element. By a movement of the adjustment element 19 and, thus, the accompanying movement of the second resonator mirror 12 the optical path length of the second laser resonator 14 can be lengthened or shortened. In this manner, it is possible to adjust the optical length of the second laser resonator 14 to the resonance frequency of an individual longitudinal mode of the second laser radiation 10. For this purpose, a photo-detector 20 is provided, which captures a small portion of the second laser beam 10 reflected on the third partially transmitting mirror 18. For even though this third partially transmitting mirror 18 is essentially transmitting for the second laser radiation 10, still, a very small portion of the second laser radiation 10 is reflected on it. This applies in equal measure to the other partially transmitting mirrors and also to the laser radiations with other frequencies.

As the second non-linear crystal 16 is made of a material that has electro-optical properties, a phase modulation is impressed onto the second laser radiation 10. This happens by applying a high-frequency electrical field to two suitable contact surfaces of the second non-linear crystal 16. The phase or amplitude modulation of the second laser radiation 10, now detected by the photo-detector 20, then serves as input signal for a control loop 21, which is formed between the photo-detector 20 and the adjustment element 19. The control loop 21 here works in a manner comparable to the Pound-Drever-Hall technique. By means of the control loop 21 and the adjustment element 19 the optical length of the second laser resonator 14 is then adjusted such that the intensity of the circulating second laser radiation 10 reaches its maximum. This is the case when merely one longitudinal mode of the second laser radiation 10 circulates in the second laser resonator 14 while resonating, insofar as the selected longitudinal mode is the middle one of the actually three resulting longitudinal modes. As already mentioned, the frequency conversion of the first laser radiation 6 by the first non-linear crystal 9 leads to a splitting of the two longitudinal modes of the first laser radiation 6 into three frequencies of the second laser radiation 10. By adjusting the optical length of the second laser resonator now the middle one of these three frequencies is selected in order to in this manner ensure that the second laser radiation 10 consists of only a single longitudinal mode, that is, that it is composed of a single frequency. As a result, the second non-linear crystal 16 also only generates a single-frequency third laser radiation 17.

As evident from FIG. 1, the exemplary embodiment illustrated therein can do without specific frequency filters or other frequency-selective elements. This increases the efficiency degree of the frequency conversion, because no light intensity is lost due to such frequency-selective elements.

Figure 2:
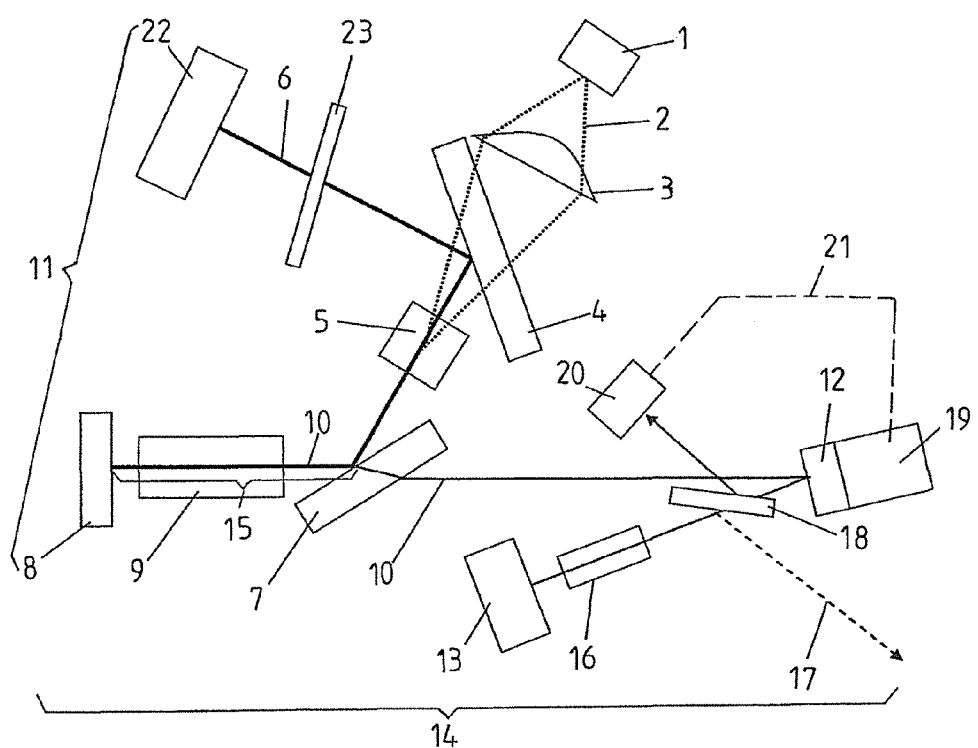
FIG. 2 shows a second exemplary embodiment of a laser arrangement for generating a twice frequency-converted laser radiation.

FIG. 2 shows a second exemplary embodiment of a laser arrangement for generating a twice frequency-converted laser radiation. The same reference signs are assigned to comparable elements with regard to the arrangement of FIG. 1, and they will not be explained separately. In particular, the arrangement of a second laser resonator 14 in the exemplary embodiment of FIG. 2 is identical to the exemplary embodiment illustrated in FIG. 1. Regarding a first laser resonator 11, however, there are modifications, which will be addressed in more detail subsequently.

For instance, a fourth resonator mirror 22 is provided inside of the first laser resonator 11. That is to say, the first laser resonator 11 consists of this fourth resonator mirror 22, a first partially transmitting mirror 4, a second partially transmitting mirror 7 and a first resonator mirror 8. Here, a deflection of a first laser beam 6 inside the first laser resonator 11 takes place both at the first partially transmitting mirror 4 and at the second partially transmitting mirror 7. The first partially transmitting mirror 4 is here arranged in the immediate vicinity of a laser crystal 5, whereby it becomes possible to bring a pump light source 1 closer to the laser crystal 5 and to allow for a more compact construction of the laser arrangement altogether. Furthermore, in this manner a larger numeric aperture for the pump light 2 is possible, so that a larger portion of the pump light 2 generated by the pump light source 1 contributes to the pumping process in the laser crystal 5.

Moreover, an etalon 23 is arranged between the fourth resonator mirror 22 and the first partially transmitting mirror 4, which said etalon 23 serves as a frequency-selective element. The etalon 23 has frequency-dependent attenuation profiles, so that it prevents the oscillation build-up of additional longitudinal modes of the first laser radiation 23. Thereby, an increase of the amplitude noise of the first laser radiation 6 is avoided. The attenuation profile of the etalon 23 can be adjusted and optimized by changing the incident angle of the first laser radiation 6 onto the etalon 23 or by the temperature.

The presence of the etalon 23 inside of the first laser resonator 11, however, is not necessary. Rather, an alternative design of the second exemplary embodiment would also be conceivable, which can do without the etalon 23, that is, without a frequency-selective element altogether. In order to ensure the presence of merely two adjacent longitudinal modes of the first laser radiation 6 here, it would, however, be necessary to arrange the laser crystal 5 in the optical center between the first resonator mirror 8 and the fourth resonator mirror 22 or to attain a corresponding selection of only two adjacent longitudinal modes by taking a different approach.

Figure 3:
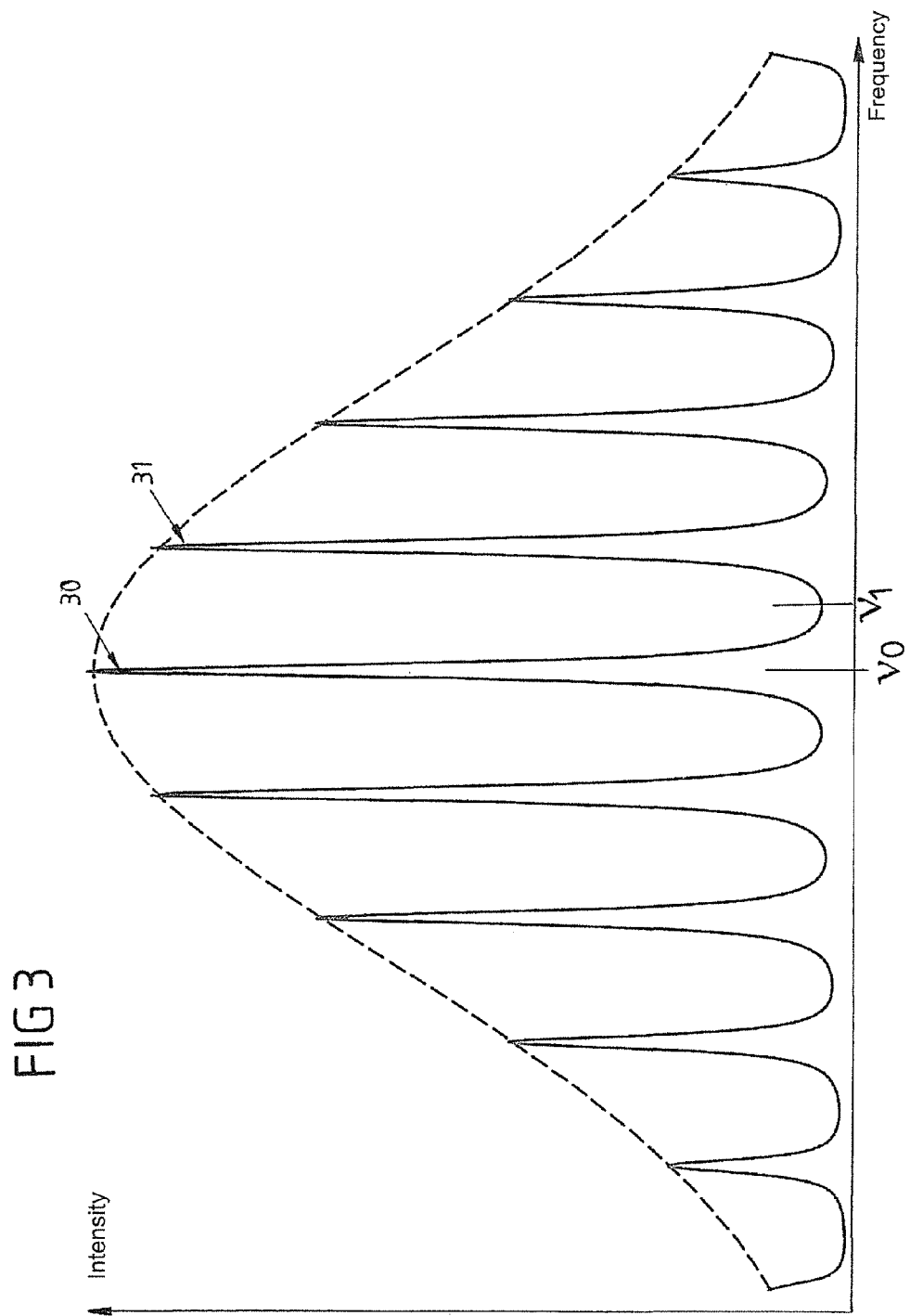
FIG. 3 shows a schematic illustration of the longitudinal modes of a laser radiation and FIG. 4 shows a third exemplary embodiment of a laser arrangement for generating a twice frequency-converted laser radiation.

FIG. 3 shows a schematic illustration of a typical laser signal. Such a laser signal consists of a multitude of longitudinal modes. In FIG. 3 the reference signs 30 and 31 mark the two longitudinal modes of the exemplary laser signal that have the highest intensity. These two longitudinal modes 30 and 31 represent two adjacent longitudinal modes, which the first laser radiation in the scope of the presently claimed invention can be composed of in an aspect. It would basically also be conceivable not to select the two longitudinal modes with the highest intensity. However, this would involve an undesirable efficiency reduction of the laser arrangement. The first frequency of the first laser radiation here is the middle frequency $\square_1$ of the two selected longitudinal modes 30 and 31. This middle frequency $\square_1$ does not necessarily coincide with the middle frequency $\square_0$ that would result if all other longitudinal modes of a comparable laser signal were taken into account.

Figure 4:
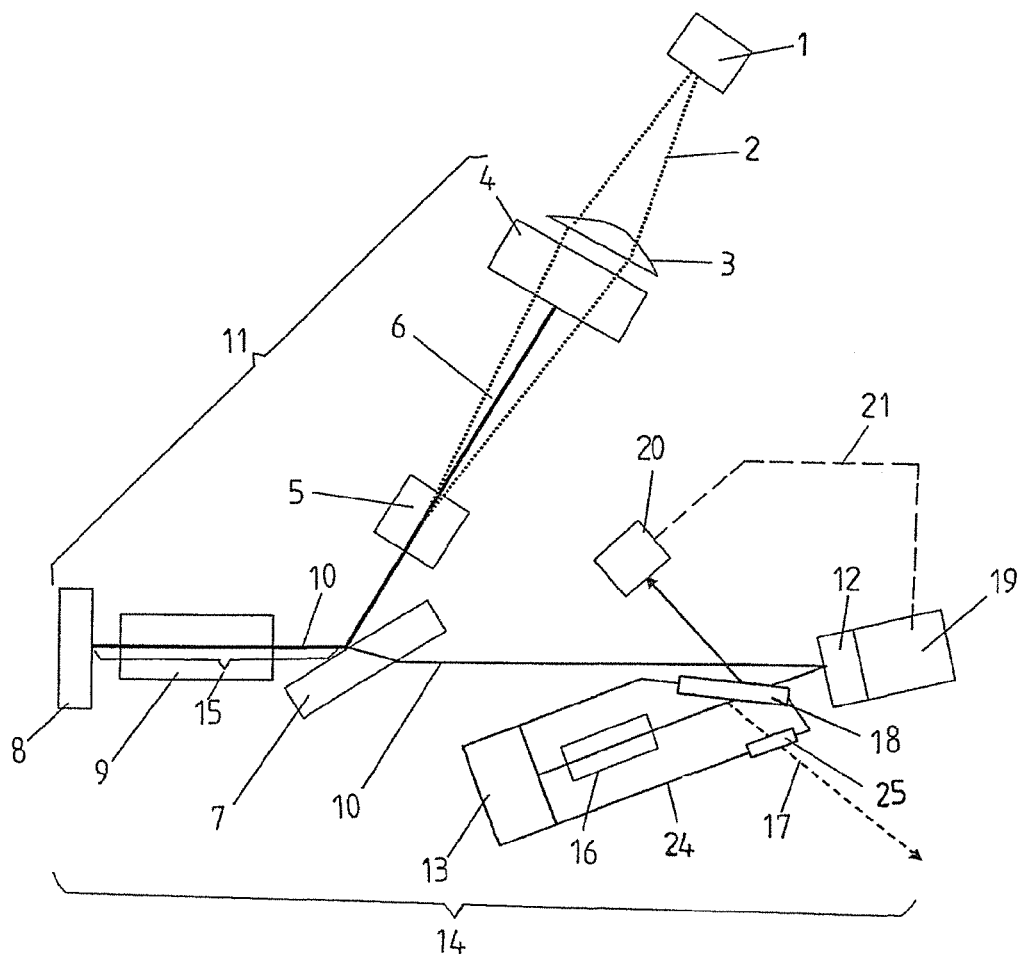

FIG. 4 shows a schematic illustration of a third exemplary embodiment of a laser arrangement for generating a twice frequency-converted laser radiation. This exemplary embodiment resembles the first exemplary embodiment, wherein the same reference signs are assigned to the same elements. In this regard, reference is made to the explanations relating to FIG. 1. Hereinafter, only the differences to the exemplary embodiment of FIG. 1 shall be explained.

The second non-linear crystal 16, the third partially transmitting mirror 18 as well as the third resonator mirror 13 are in the third exemplary embodiment hermetically sealed against the surroundings. For this purpose, these elements are located in a chamber 24 made of UV-resistant material, e.g. of metal. Additionally, there is adsorbing material in the chamber. Through a window 25 made of UV-transmitting material the third laser beam 17 can leave the hermetically sealed area.

The invention claimed is:

1. A laser arrangement for generating a twice frequency-converted laser radiation, having
    an active medium, which by radiation of pump light generates a first laser radiation with a first frequency,
    a first laser resonator, inside of which the first laser radiation circulates while resonating,
    a first non-linear crystal, which is arranged inside of the first laser resonator and is provided and established to convert the first laser radiation into a second laser radiation with a second frequency that is higher than the first frequency,
    a second laser resonator, inside of which the second laser radiation circulates while resonating,
    a second non-linear crystal, which is arranged inside of the second laser resonator and is provided and established to convert the second laser radiation into a third laser radiation with a third frequency that is higher than the second frequency,
    wherein the first laser resonator and the second laser resonator are arranged relative to each other such that they have a joint optical section through which both the first laser radiation, circulating in the first laser resonator, and the second laser radiation, circulating in the second laser resonator, radiate,
    wherein the first laser resonator and the active medium are designed and arranged such that the first laser radiation consists of precisely two adjacent longitudinal modes with two frequencies, wherein the second frequency of the second laser radiation is the sum frequency of these two frequencies, and in that the second laser resonator has an optical path length which allows for a resonance of merely a single longitudinal mode of the second laser radiation.

2. The laser arrangement according to claim 1, wherein the active medium is arranged in the optical center of the first laser resonator.

3. The laser arrangement according to claim 1, wherein there are no frequency-selective components inside of the first laser resonator and/or the second laser resonator.

4. The laser arrangement according to claim 1, wherein the joint optical section is formed between a joint mirror of the first laser resonator and of the second laser resonator and a partially transmitting mirror, said partially transmitting mirror being essentially reflective for the first laser radiation and essentially transmitting for the second laser radiation or being essentially transmitting for the first laser radiation and essentially reflective for the second laser radiation.

5. The laser arrangement according to claim 1, wherein the first non-linear crystal is arranged inside of the joint optical section.

6. The laser arrangement according to claim 1, wherein the second non-linear crystal has a material having electro-optical properties.

7. The laser arrangement according to claim 1, wherein the laser arrangement has a light sensitive element which is arranged such that a part of the second laser radiation circulating in the second laser resonator is directed onto the light sensitive element.

8. The laser arrangement according to claim 7, wherein the laser arrangement has a control appliance which is provided and established to modify the optical path length of the second laser resonator depending on the properties of the laser radiation directed onto the light sensitive element.

9. The laser arrangement according to claim 1, wherein the second laser resonator has a movable deflecting mirror.

10. The laser arrangement according to claim 1, wherein at least parts of the second laser resonator are hermetically sealed against its surroundings and in that an adsorbing material is contained therein.

11. The laser arrangement according to claim 10, wherein the adsorbing material has a molecular sieve and activated carbon.

* * * * *